(12) United States Patent
Kima

(10) Patent No.: US 6,645,105 B2
(45) Date of Patent: Nov. 11, 2003

(54) POWER TRANSMISSION APPARATUS FOR A HYBRID VEHICLE AND A METHOD FOR CONTROLLING THE APPARATUS

(75) Inventor: Yasuo Kima, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/180,095

(22) Filed: Jun. 27, 2002

(65) Prior Publication Data
US 2003/0045389 A1 Mar. 6, 2003

(30) Foreign Application Priority Data
Aug. 31, 2001 (JP) ......................... 2001-264345

(51) Int. Cl.[7] .............................. F16H 3/72; B60K 41/02
(52) U.S. Cl. ................................................ 475/5; 477/5
(58) Field of Search ........................... 477/3, 5; 475/5; 180/65.2, 65.3, 65.4

(56) References Cited

U.S. PATENT DOCUMENTS

| | | | | |
|---|---|---|---|---|
| 5,337,848 A | * | 8/1994 | Bader ......................... | 477/5 X |
| 6,159,127 A | * | 12/2000 | Loeffler et al. ................ | 477/5 |
| 6,371,882 B1 | * | 4/2002 | Casey et al. ................ | 475/5 X |
| 6,490,945 B2 | * | 12/2002 | Bowen ......................... | 74/339 |
| 6,558,283 B1 | * | 5/2003 | Schnelle ......................... | 475/5 |
| 2001/0013438 A1 | * | 8/2001 | Stenvall et al. ............ | 180/65.4 |

FOREIGN PATENT DOCUMENTS

| | | |
|---|---|---|
| JP | 08-183347 | 7/1996 |
| JP | 08-183348 | 7/1996 |
| JP | 09-277847 | 10/1997 |

* cited by examiner

Primary Examiner—Roger Pang
(74) Attorney, Agent, or Firm—Arent Fox Kintner Plotkin & Kahn PLLC

(57) ABSTRACT

The object of the present invention is to provide a power transmission apparatus which enables a shifting with high efficiency and small shock. A power transmission apparatus for a hybrid vehicle having two driving means; an engine and a motor generator, including; a planetary gear unit including at least a sun gear, a carrier and a ring gear; and a counter shaft for transmitting power to driving wheels of a vehicle, wherein the rotor of the motor generator is connected to the sun gear, an engine output shaft and a first main shaft which is capable of transmitting torque to the counter shaft through gears in a plurality of transmission gear ratios are connected to the carrier, and torque of the ring gear can be transmitted through gears to a second main shaft which is capable of transmitting torque to the counter shaft through gears in a plurality of transmission gear ratios.

4 Claims, 8 Drawing Sheets

ENGINE START – LAUNCH (RING SHAFT SIDE)

SECOND SPEED (CARRIER SHAFT SIDE)

SECOND SPEED (RING SHAFT SIDE)

THIRD SPEED

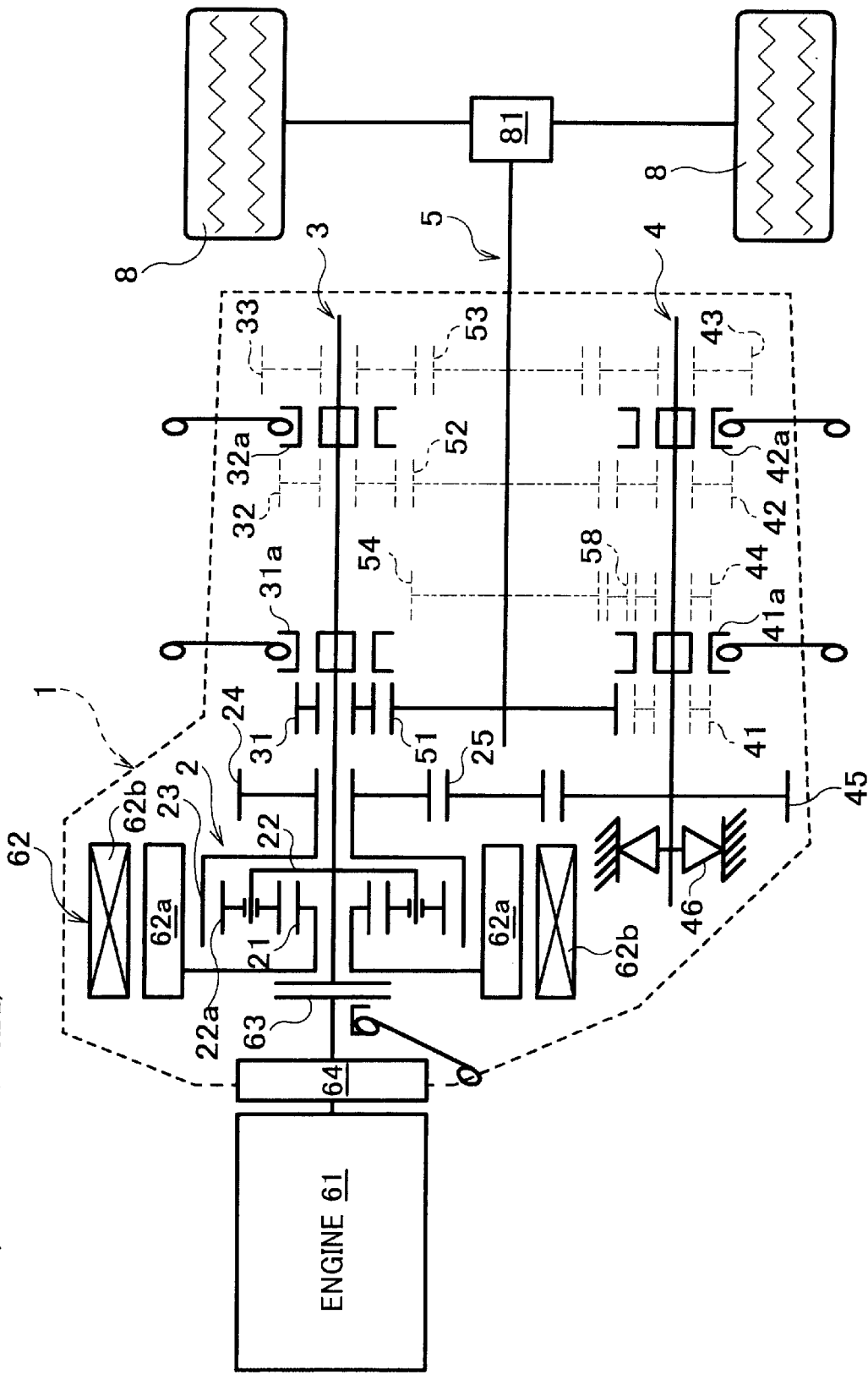

POWER TRANSMISSION APPARATUS FOR A HYBRID VEHICLE AND A METHOD FOR CONTROLLING THE APPARATUS

FIELD OF THE INVENTION

The present invention relates to a power transmission apparatus for a hybrid vehicle and a method for controlling the apparatus which has two driving means of an engine and a motor, and particularly to those enabling high transmission efficiency and a reduction in the shock at shifting.

BACKGROUND OF THE INVENTION

As a power transmission apparatus for a hybrid vehicle, which has both engine and a motor as vehicle driving means, the following are disclosed.

First, Japanese Laid-Open Patents 8-183347 and 8-183348 disclose the power transmission apparatus, in which an engine output shaft is connected to the carrier of a planetary gear and a generator input shaft to the sun gear, thereby transmitting the combined output of a ring gear and a motor to driving wheels. This power transmission apparatus for a hybrid vehicle distributes the power of an engine and the motor by a planetary gear unit so that the motor may bear the larger load than the engine while driving at a high speed and power.

Secondly, a power transmission apparatus for a hybrid vehicle, disclosed in Japanese Laid-Open Patent 9-277847, in which an engine output shaft is connected to the ring gear of a planetary gear unit and a motor generator output shaft to the sun gear, thereby transmitting the rotation of the carrier to driving wheels through an automatic transmission.

Of the power transmission apparatus for a hybrid vehicle mentioned above, the former apparatus has suffered from the problem that a large amount of power is required for the motor since it has no transmission between the motor and the driving wheels.

On the other hand, the latter apparatus is free of the above-mentioned problem since a transmission is provided between the carrier, to which the combined output of the engine and the motor is transmitted, and the driving wheels. When a shifting from the first to the second shifting level is performed by the transmission, it is not possible to shift smoothly unless the number of revolutions of the driving wheel side shaft and that of the second shifting level shaft are synchronized with the number of revolutions of the engaging gears. It will be one of the causes for the shifting shock. The synchronization will require an additional synchronizing mechanism, which results in the complex apparatus. If a transmission with a torque converter or a continuously variable transmission with a belt is employed, it will possibly raise a problem of power transmission loss due to the slip of the torque converter or the belt.

SUMMARY OF THE INVENTION

The present invention to assess the problems described above provides a power transmission apparatus for a hybrid vehicle and a method for controlling the apparatus, which enable the reduction in the shifting shock as well as high power transmission efficiency.

The present invention provides a power transmission apparatus for a hybrid vehicle including two driving means; an engine and a motor generator which has a rotor to rotate supplied with electricity and serves as a power generator supplied with torque, comprising; a planetary gear unit including at least a sun gear, a carrier and a ring gear; and a counter shaft for transmitting power to driving wheels of the vehicle, wherein the rotor of the motor generator is connected to the sun gear, an engine output shaft and a first main shaft which is capable of transmitting torque to the counter shaft through first gears in a first plurality of transmission gear ratios are connected to the carrier, and torque of the ring gear can be transmitted through second gears to a second main shaft which is capable of transmitting torque to the counter shaft through third gears in a second plurality of transmission gear ratios.

The power transmission apparatus for a hybrid vehicle transmits the combined power of the engine and the motor generator, distributing it to a first main shaft and a second main shaft, thereby allowing both of them to transmit torque to a counter shaft through gears in multiple shift ratios. When a shifting is performed from the first shift level, in which the torque is transmitted to the counter shaft with one of the first and the second main shafts, to the second shift level, in which the torque is transmitted to the counter shaft with the other remaining main shaft, it is possible to keep one main shaft driving and control the number of revolutions of the other main shaft simultaneously, thereby synchronizing the number of revolutions of the other shaft with that of the counter shaft to engage them smoothly. Provision of the two power transmission paths allows one of them to transmit the power to the counter shaft and the other to be synchronized with it in parallel, thereby achieving a small shifting shock and an excellent acceleration by obviating the shifting time lag due to the disconnection of the power.

The present invention according to claim 2 provides the power transmission apparatus for a hybrid vehicle of claim 1, wherein the engine output shaft and the carrier are connected through a clutch, which is capable of connecting and disconnecting power selectively.

The introduction of a clutch, provided between the engine output shaft and the carrier, which is capable of connecting and disconnecting the power selectively, permits an energy efficient power transmission by obviating the energy loss due to the engine rotation, disengaging the clutch and stopping the engine, when a hybrid vehicle is driven by a motor generator only. The engagement and disengagement of gears will also be performed smoothly by disengaging the clutch at the engine start.

The present invention according to claim 3 or 4 provides a method for controlling the power transmission apparatus for a hybrid vehicle of claim 1 or 2 respectively, the method comprising the steps of; when a shifting is performed from a first shifting level to a second shifting level, synchronizing one of the first and second main shafts with the counter shaft in the second shifting level by controlling a number of revolutions of the motor generator, while the other of the shafts engages with the counter shaft in the first shifting level; and performing a transition from the first shifting level to the second shifting level by connecting one of the shafts with the counter shaft while disconnecting the other of the shafts from the counter shaft.

Controlling the power transmission apparatus for a hybrid vehicle according to claim 1 or claim 2 this way allows the shifting from the first to the second shift level smoothly, since the connection is performed after the completion of the rotational synchronization by the motor generator, when a shaft is connected to the counter shaft in the second shift level.

The first and the second shift levels are defined as a shift level and another shift level different from the former, not meaning a low speed (first speed) or second speed. A shift from the first to the second shift level includes shifting from the second to the third speed or from the third to the low speed (first speed).

The connection according to claim 1 and claim 2 is defined as the conditions in which the torque is transmitted irrespective of the existence of a power transmission means such as a gear in between.

BRIEF DESCRIPTION OF THE DRAWINGS

FIG. 8 first is a skeleton diagram showing the conditions of gear engagement for the first speed of the carrier shaft side.

DESCRIPTION OF THE PREFERRED EMBODIMENTS

The embodiment of the present invention will now be described referring to the accompanying drawings. The abbreviations in the parentheses will be used in the following descriptions.

Figure 1:
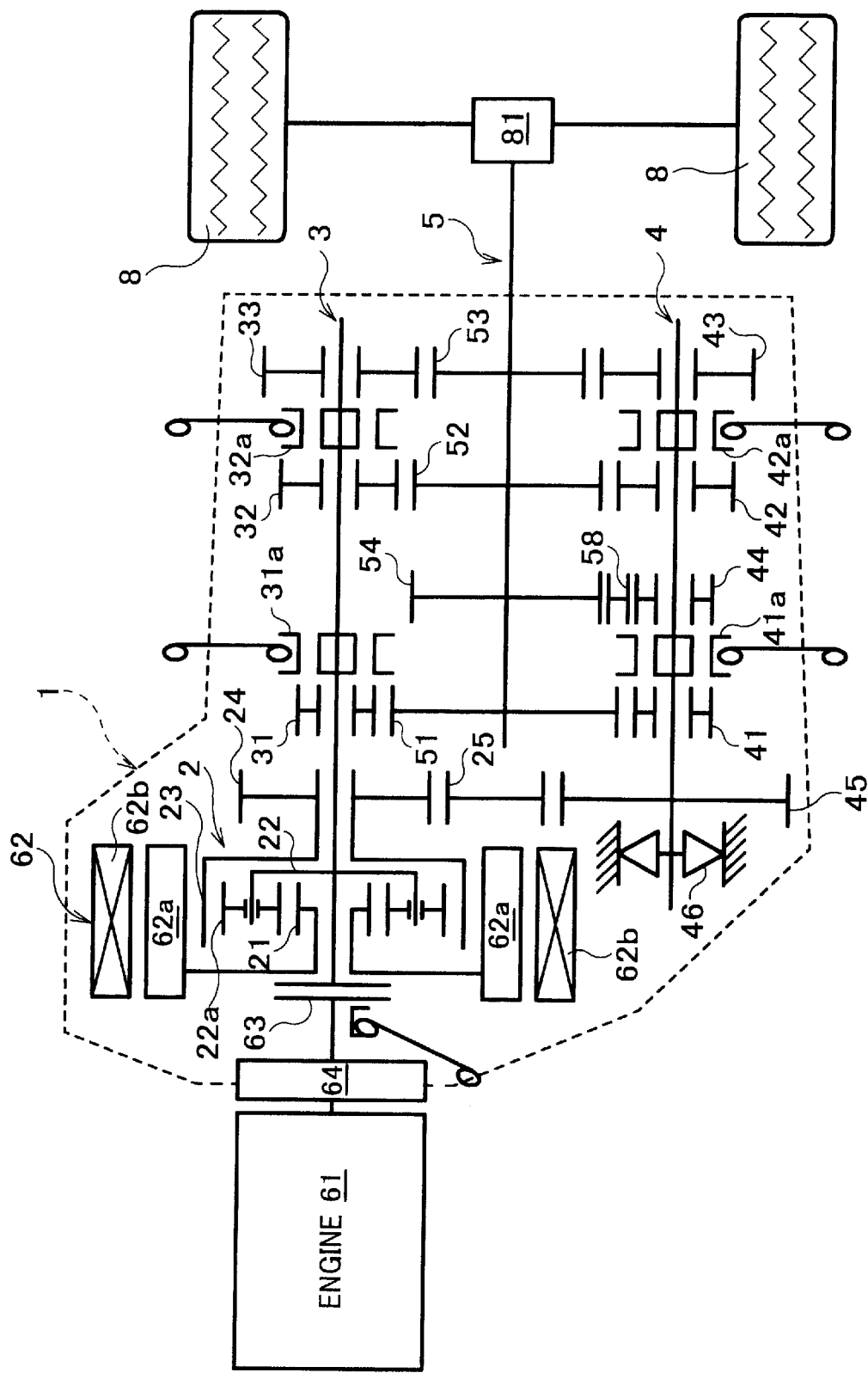
FIG. 1 is a skeleton diagram showing the power transmission apparatus for a hybrid vehicle.

FIG. 1 is a conceptual view illustrating the structure of the power transmission apparatus for a hybrid vehicle (hereinafter referred to as vehicle) according to the embodiment of the present invention.

[Power Transmission Apparatus 1]

As shown in FIG. 1 a power transmission apparatus 1 includes a planetary gear unit 2 having a sun gear 21, a carrier 22 and a ring gear 23; a carrier shaft 3 corresponding to a first main shaft which is connected coaxially to the carrier 22; a ring shaft 4 corresponding to a second main shaft which is transmitted the torque from the ring gear 23 through gears; and a counter shaft 5 which is connected to driving wheels 8 of a hybrid vehicle through a differential gear 81.

The sun gear 21 is connected to a rotor 62a of a motor generator 62, thereby rotating in unison with it.

The motor generator 62 can serve as a motor rotating the rotor 62a when a stator coil 62b is supplied with electricity to generate a magnetic field. On the other hand, it also serves as a generator generating the current with the stator coil 62b, when the sun gear in unison with the rotor 62a is rotated by the external force to generate a magnetic field. The motor generator (hereinafter referred to as motor) 62 is capable of controlling the generated power by regulating the current supplied to the stator coil 62b.

The carrier 22—a rotating part, which is connected to the carrier shaft 3, accompanies the revolution of a planetary gear 22a. One end of the carrier shaft 3 is so arranged that it may transmit the torque to the counter shaft 5 in three kinds of transmission gear ratios. The other end of it is connected to the output shaft of an engine 61 through a clutch 63 and a fly wheel 64 passing through the center of the sun gear 21. The output shaft of the engine 61 and the carrier 22 thus rotate in unison when the clutch 63 is engaged.

Any type of engine will be acceptable for the engine 61 irrespective of a gasoline engine, a diesel engine, a reciprocal or a rotary engine as long as it belongs to an internal combustion engine.

The clutch 63 is for connecting and disconnecting the power transmission between the engine 61 and the carrier shaft 3 selectively. A friction clutch is preferred in terms of the power transmission efficiency.

The ring gear 23 is in unison with a ring drive gear 24, which rotates coaxially outside the carrier shaft 3. The ring drive gear 24 engages with a ring idle gear 25, which engages with a ring driven gear 45 serving as the input side gear of the ring shaft 4. The torque of the ring drive gear 24 is thus transmitted to the ring driven gear 45 through the ring idle gear 25.

The carrier shaft 3 is equipped with a carrier low gear (CL gear) 31, a carrier second gear (CS gear) 32 and a carrier third gear (CT gear) 33, which can be connected to and disconnected from the carrier shaft 3, in order to transmit the torque to the counter shaft 5 in three kinds of transmission gear ratios. The CL gear 31 is able to be connected and disconnected to the carrier shaft 3 by a carrier low dog clutch (CLDOG) 31a. The CS gear 32 and the CT gear 33 can be connected to and disconnected from the carrier shaft 3 selectively by a carrier second dog clutch (CSDOG) 32a. Three conditions are selectable for the CS gear 32 and the CT gear 33 with the CSDOG 32a: either of the two gears is connected to the carrier shaft 3 and rotates in unison with it, and neither of them is connected to it.

The ring shaft 4 is equipped with a ring low gear (RL gear) 41, a ring second gear (RS gear) 42, a ring third gear (RT gear) 43 and a ring reverse gear (RR gear) 44, which can be connected to and disconnected from the ring shaft 4, in order to transmit the torque to the counter shaft 5 in four kinds of transmission gear ratios. The RL gear 41 and the RR gear 44 can be selectively connected to and disconnected from the ring shaft 4 by a ring low reverse dog clutch (RLRDOG) 41a. Three conditions are selectable for the RL gear 41 and the RR gear 44 with the RLRDOG 41a: either of the two gears is connected to the ring shaft 4 and rotates in unison with it, and neither of them is connected to it. The RS gear 42 and the RT gear 43 can be selectively connected to and disconnected from the ring shaft 4 by a ring second dog clutch (RSDOG) 42a. Three conditions are selectable for the RS gear 42 and the RT gear 43 with the RSDOG 42a: either of the two gears is connected to the ring shaft 4 and rotates in unison with it, and neither of them is connected to it.

An end of the ring shaft 4 is equipped with a starting one-way clutch (STARTING OW) 46, with which the rotational direction of the ring shaft 4 is restricted so that it may rotate driving wheels 8 forward only through forward gears such as the RL gear 41 and a counter low gear 51 to be described later.

The counter shaft 5 is transmitted the torque from the carrier shaft 3 in three transmission gear ratios and the ring shaft 4 in four transmission gear ratios. The counter shaft 5 is thus equipped with the four gears-a counter gear 51, a counter second gear 52, a counter third gear 53 and a counter reverse gear 54.

The counter low gear 51, which continuously engages with the CL gear 31 and the RL gear 41, is fixed to the counter shaft 5 in order to rotate in unison with the counter shaft 5.

The counter second gear 52, which continuously engages with the CS gear 32 and the RS gear 42, is fixed to the counter shaft 5 in order to rotate in unison with the counter shaft 5.

The counter third gear 53, which continuously engages with the CT gear 33 and the RT gear 43, is fixed to the counter shaft 5 in order to rotate in unison with the counter shaft 5.

The counter reverse gear 54, which continuously engages with the RR gear 44 through a reverse idle gear 58, is fixed to the counter shaft 5 in order to rotate in unison with the counter shaft 5. When the power is transmitted by the counter reverse gear 54, which is through the reverse idle gear 58, the counter shaft 5 rotates in a reverse direction, thereby allowing the driving wheels 8 to rotate so that the hybrid vehicle moves backward.

As shown in FIG. 1, the numbers of teeth decrease in order of the counter low gear 51, the counter second gear 52 and the counter third gear 53. The transmission gear ratios (speed reducing ratios) also decrease in the same fashion.

The structure of control system for controlling the power transmission apparatus 1 will now be described referring to FIG. 2.

[Control System]

Figure 2:
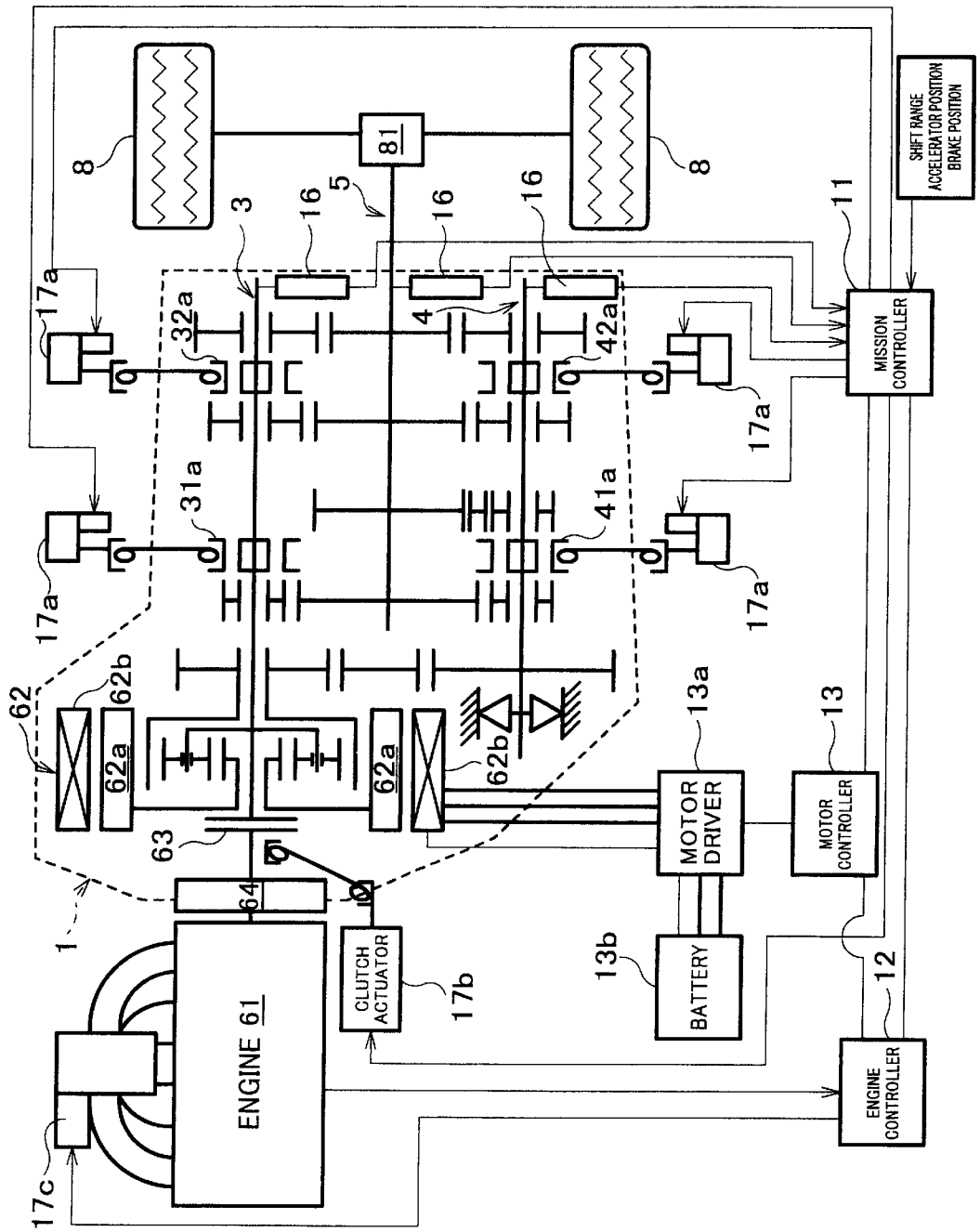
FIG. 2 is a diagram illustrating the control system for the power transmission apparatus for a hybrid vehicle.

As shown in FIG. 2, a mission controller 11, an engine controller 12 and a motor controller 13 participate in the control of the power transmission apparatus 1.

The operational conditions set by a driver such as a shift range, an accelerator position, a brake position and the like (not shown) enter the mission controller 11. The mission controller 11 communicates with tachometers 16 so that it may receive respective numbers of revolutions of the carrier shaft 3, the ring shaft 4 and the counter shaft 5. The mission controller 11 also communicates with a plurality of dog clutch actuators 17a, which are for shifting the CLDOG 31a, the CSDOG 32a, the RLRDOG 41a and the RSDOG 42a respectively, so that the mission controller 11 may control each shifting of the power transmission apparatus 1. The mission controller 11 communicates with a clutch actuator 17b in order to make an on-off switching of a clutch 63.

The engine controller 12 communicates with the sensors which detect the engine number of revolutions Ne, the temperature of coolant and the like in order to control the operation of the engine 61. It also communicates with a throttle actuator 17c in order to control the throttle angle.

The motor controller 13 supplies the stator coil 62b of the motor generator 62 with electricity through a motor driver 13a, thereby allowing the rotor 62a to generate the torque. In so doing, the motor driver 13a is supplied with electricity by a battery 13b. The motor controller 13 controls the current flowing into the stator coil 62b through the motor driver 13a, thereby generating the required electricity by the resultant external force and charging the battery 13b with it.

These mission controller 11, engine controller 12 and motor controller 13 are connected mutually in order to control the power transmission apparatus 1, the engine 61 and the motor generator 62 respectively, receiving the required vehicle sensor and control signals.

Figure 3:
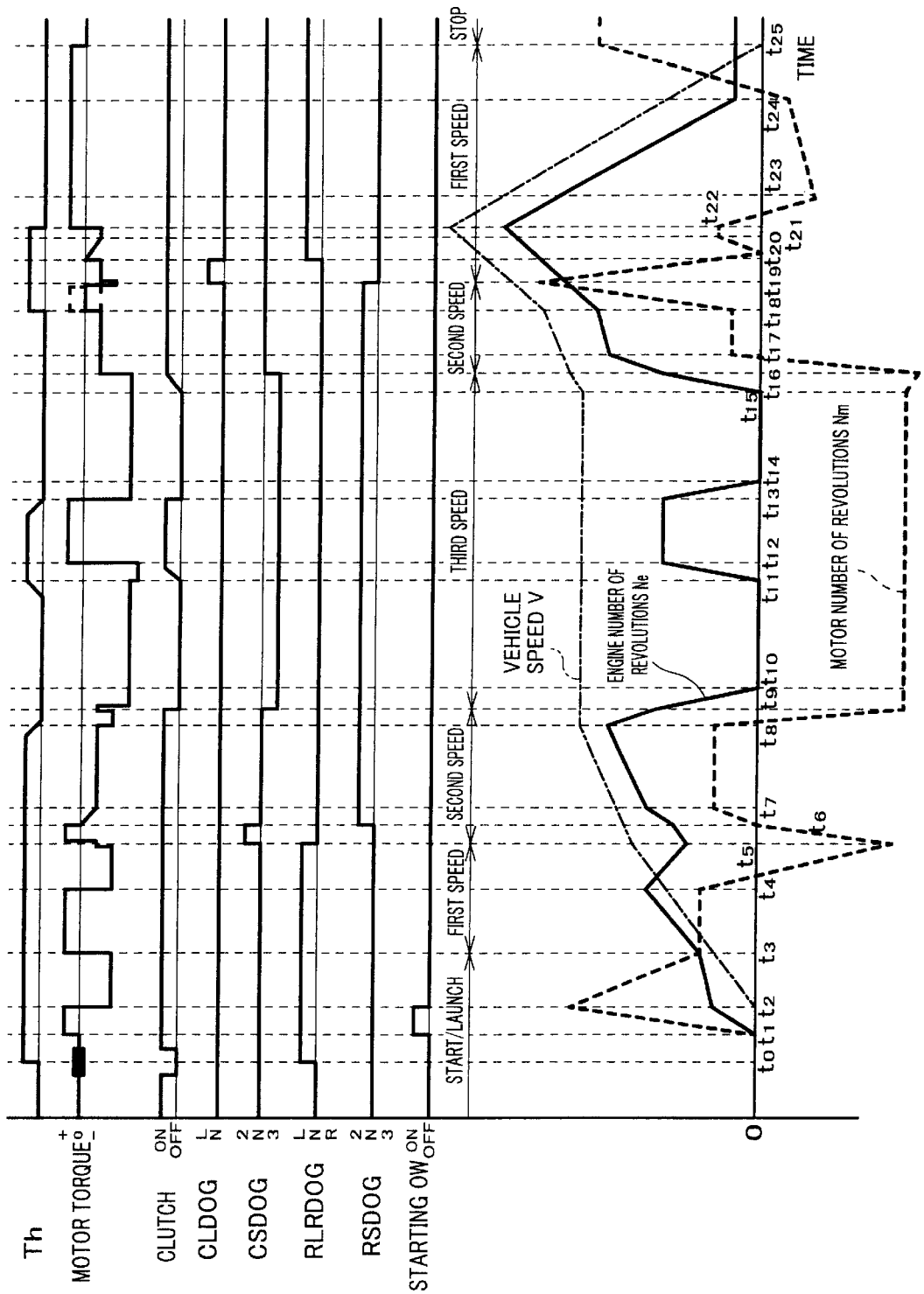
FIG. 3 is a time chart showing shifting of each gear, control value, vehicle speed, engine number of revolutions and motor number of revolutions.

The operation of the power transmission apparatus 1 of the present invention will now be described referring to the FIGS. 3–8. FIG. 3 is a graph showing the histories of a vehicle speed V, the engine number of revolutions Ne and a motor number of revolutions Nm, the conditions of engagement of the gears and the clutch and the motor torque. In FIG. 3 the horizontal axis represents the time and the vertical axis the number of revolutions and the speed. FIGS. 4–8 are skeleton diagrams showing the conditions of gear engagement of a hybrid vehicle in operation, in which the gears shown in the two dot lines are not engaged, namely have no contribution to the power transmission.

[Engine Start to Vehicle Launch]

When the vehicle is stationary and the engine is off, each of the CLDOG 31a, CSDOG 32a, RLRDOG 41a and RSDOG 42a is in neutral (N).

First at t0 of the horizontal axis in FIG. 3, the clutch 63 is once disengaged, the RLRDOG 41a is engaged with the RL gear 41 (L side) while rotating the motor 62 back and forth slightly, and the clutch 63 is engaged. Rotation of the motor back and forth slightly is to make it possible for the RLRDOG 41a to engage with the RL gear 41.

Figure 4:
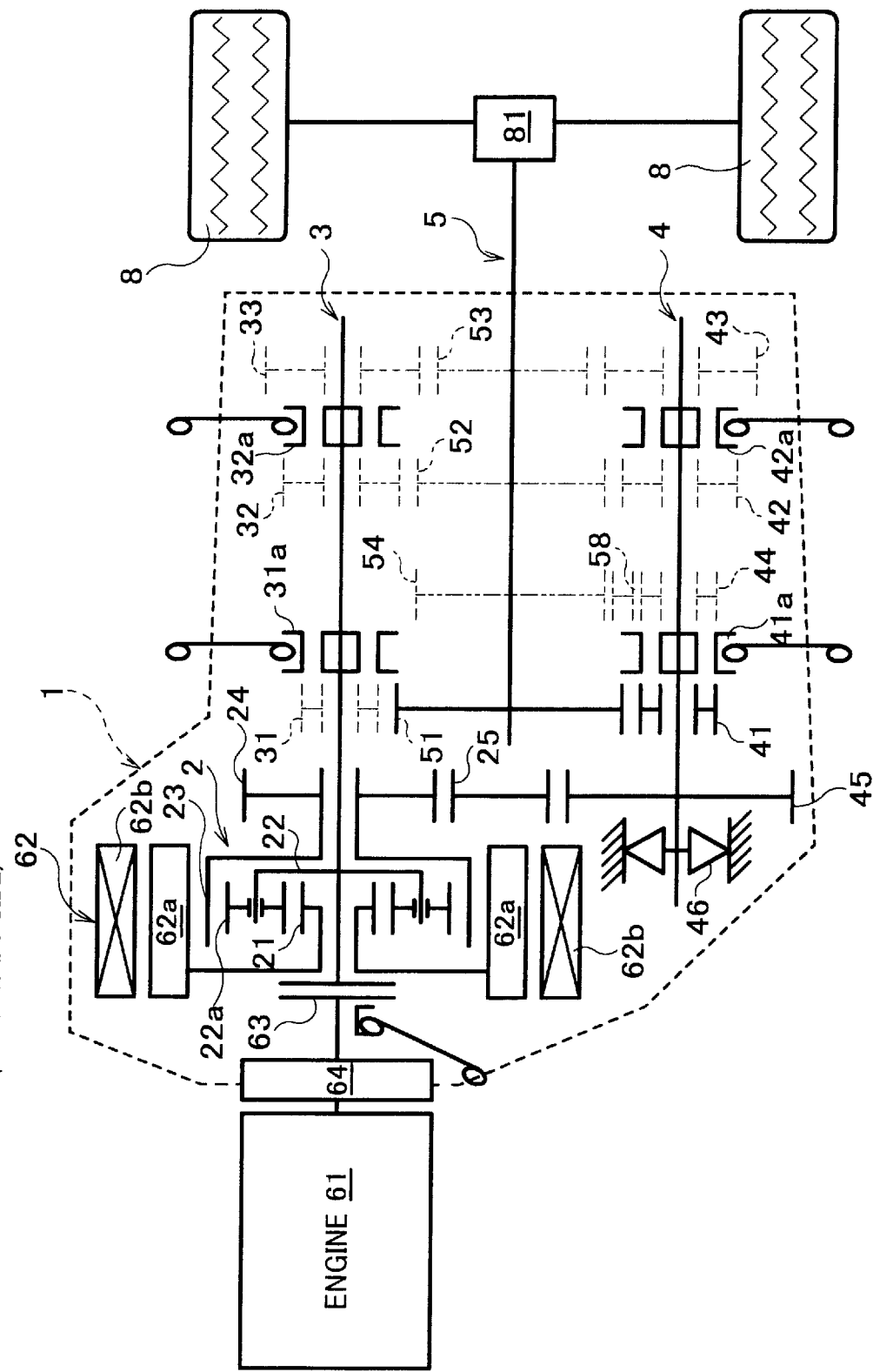
FIG. 4 is a skeleton diagram showing the conditions of gear engagement during the engine start to the vehicle launch.

Next the number of revolutions Nm of the motor 62 is increased by exerting the torque of the motor 62 in a plus direction while the STARTING OW 46 is activated so that the rotation of the ring shaft 4 is stopped. FIG. 4 shows the conditions of gear engagement for this case. Since the rotational direction of the ring shaft 4 is restricted by the STARTING OW 46, that of the ring gear 23 is restricted, thus the torque of the motor 62 is transmitted to the carrier 22 through the sun gear 21 and the planet gear 22a, thereby rotating the engine 61. When the number of revolutions of the engine 61 reaches a predetermined number, the engine 61 will start.

The vehicle accelerates depending on the gradual increase in the transmission gear ratio between the engine 61 and the driving wheels 8 (hereinafter referred to as transmission gear ratio) when the motor 62 is decelerated by decreasing the torque of the motor 62 and the motor number of revolutions Nm (sun gear number of revolutions), generating electricity in parallel. If the motor controller 13 controls the motor 62 so that the motor number of revolutions Nm may be constant when the motor number of revolutions Nm reaches a predetermined number (t3), a first speed will be achieved. In this connection, the number of revolutions Nm of the motor 62 for regeneration is determined depending on the electric power demand of a vehicle. The more the engine number of revolutions Ne increases, the more a vehicle speed V will increase (t3→t4).

When the vehicle is moved backward, the driving wheels 8 are rotated backward through the RR gear 44, the reverse idle gear 58 and the counter reverse gear 54 by engaging the RLRDOG 41a with the RR gear 44 (R side).

[First Speed→Second Speed]

Figure 5:
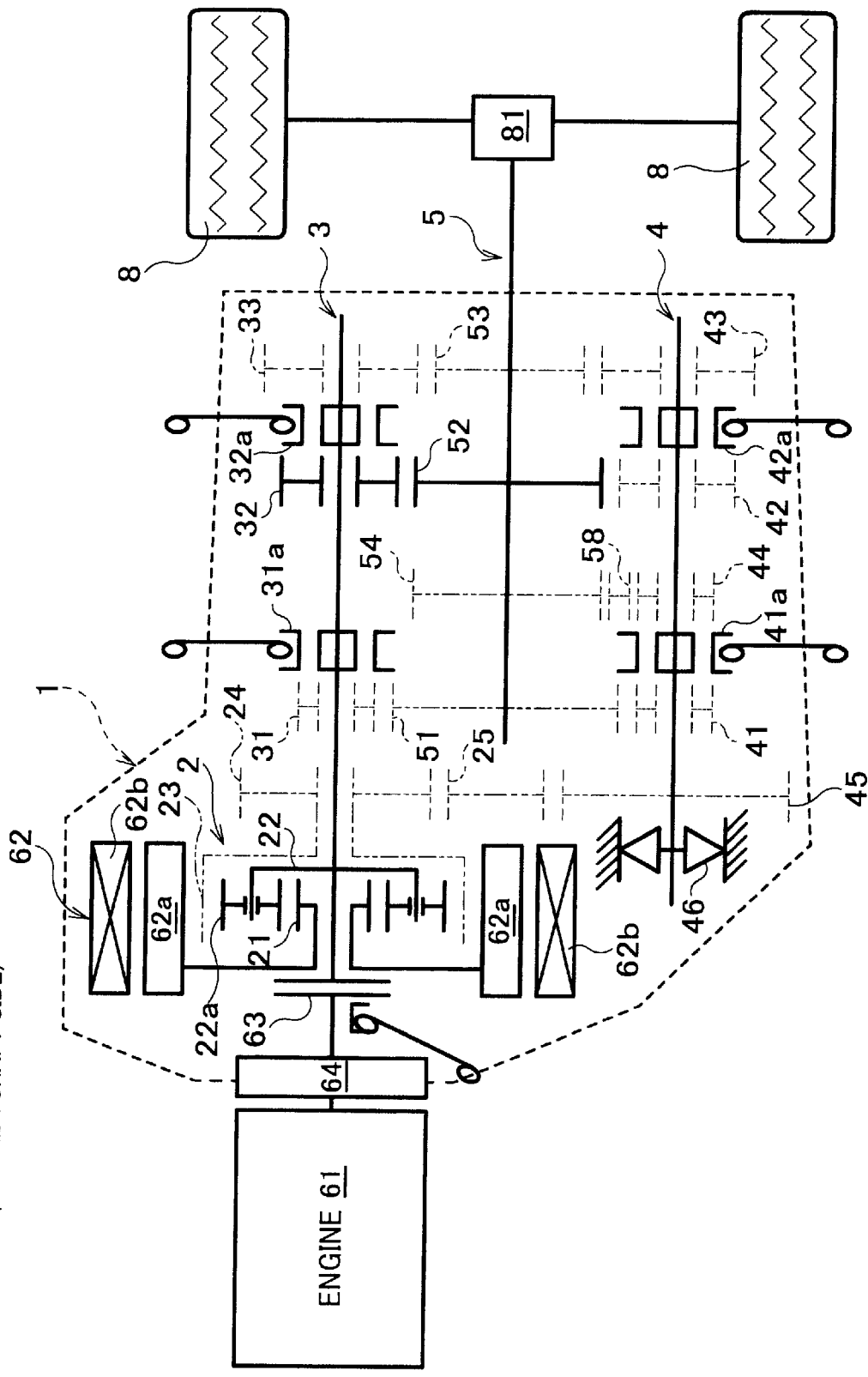
FIG. 5 is a skeleton diagram showing the conditions of gear engagement for the second speed of the carrier shaft side.

The motor number of revolutions Nm as well as the engine number of revolutions Ne are decreased in preparation for the shifting from the first to the second speed. It follows that the number of revolutions of the CS gear 32 is synchronized with that of the carrier shaft 3 (CSDOG 32a) and thereby the CSDOG 32a is engaged with the CS gear 32 (second speed side). At the same time the RLRDOG 41a is set in neutral and the power transmission path is switched from the path through the ring shaft 4 and the RL gear 41 to another path through the carrier shaft 3 and the CS gear 32 (t5). FIG. 5 shows the conditions of gear engagement for this case.

The switching of the power transmission path is performed after the rotational synchronization between the carrier shaft 3 and the CS gear 32 by controlling the motor torque, which permits a smooth shifting without a shock. A smooth acceleration feeling free of discontinuity can be attained, since the disconnection of the power by a clutch, for example, is not required at shifting.

Figure 6:
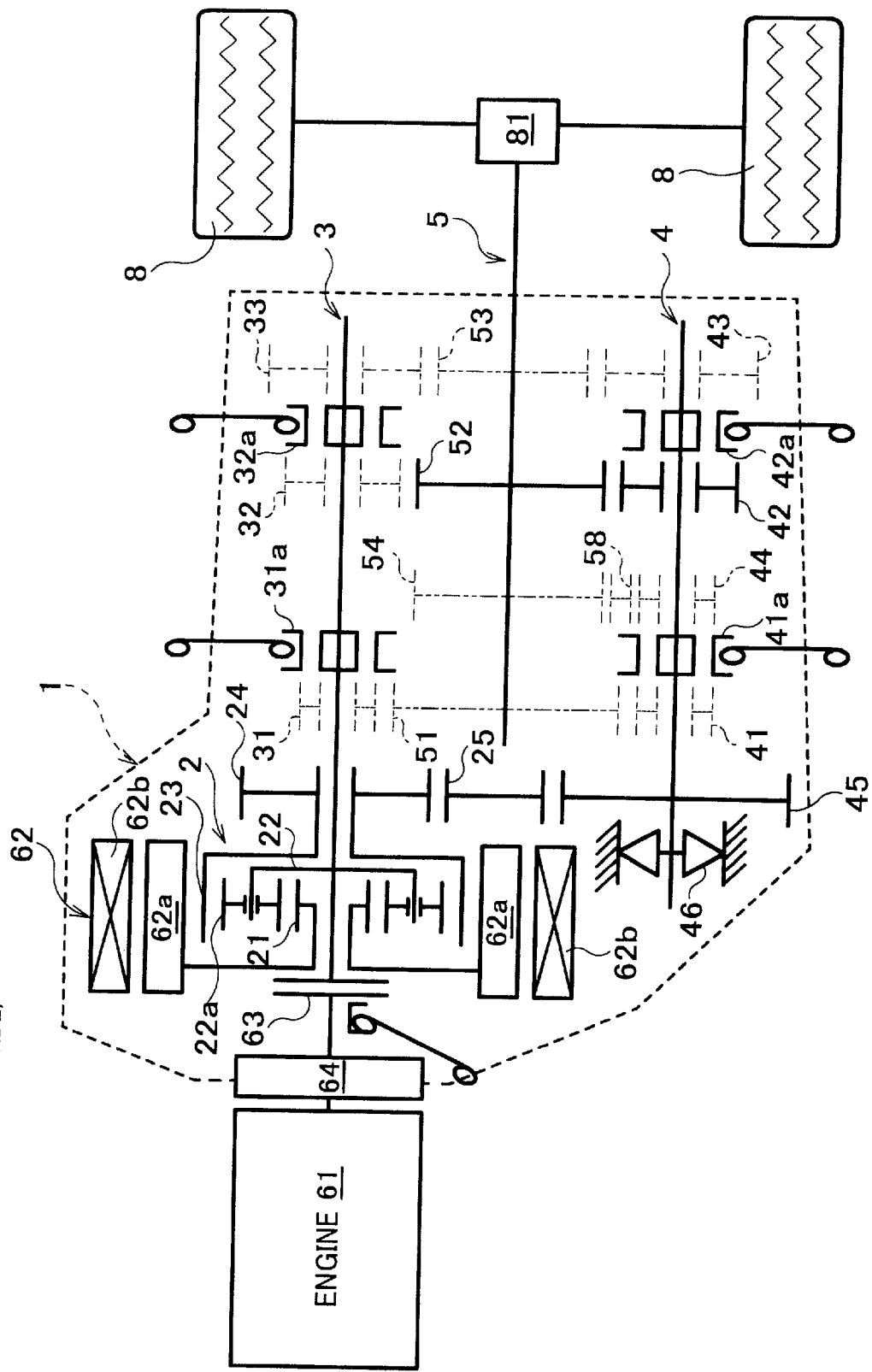
FIG. 6 is a skeleton diagram showing the conditions of gear engagement for the second speed of the ring shaft side.

At the next step the motor torque is increased in a plus direction and the engine 61 is accelerated by increasing its number of revolutions. At the completion of the rotational synchronization between the ring shaft 4 and the RS gear 42 (t6), the CSDOG 32a is returned to neutral while the RSDOG 42a is engaged with the RS gear 42 (second speed side). It follows that the power transmission path is switched from the path through the carrier shaft 3 and the CS gear 32 to another path through the ring shaft 4 and the RS gear 42. If the motor number of revolutions Nm reaches a predetermined number by controlling the motor torque, the shifting from the first to the second speed will be completed (t7). FIG. 6 shows the conditions of gear engagement for this case, in which the vehicle runs generating electricity with the motor 62 and performing the regenerative charging for the battery 13b.

When the switching from the power transmission path through the carrier shaft 3 to that through the ring shaft 4, a smooth acceleration feeling can also be attained without a shifting shock the same as the switching of power transmission path described before.

In this embodiment, the second speed driving with the regenerative charging has been exemplified, in which the power transmission through the carrier shift 3 is switched to that through the ring shaft 4. Other patterns of driving mode are acceptable depending on the road conditions and the state of charge of the battery 13b.

Following are some of the examples. One is a waiting mode for a kick-down from the second to the first speed. Under this condition, the throttle of the engine 61 is set in a full open position to perform regenerative charging for the battery 13b with the electricity generated by the motor 62, thereby controlling the engine power; or the motor 62 is kept at rest by setting the RLRDOG41a in neutral. The waiting mode for shifting from the second to the third speed is also provided by synchronizing the rotation of the ring shaft 4 with that of the RT gear 43.

The mission controller 11 makes the selection of the driving modes depending on the driving conditions of the vehicle in operation. It is also possible to select an appropriate mode from the multiple driving modes for other cases of the present embodiment depending on the driving conditions of the vehicle in operation.

[Second Speed→Third Speed]

Figure 7:
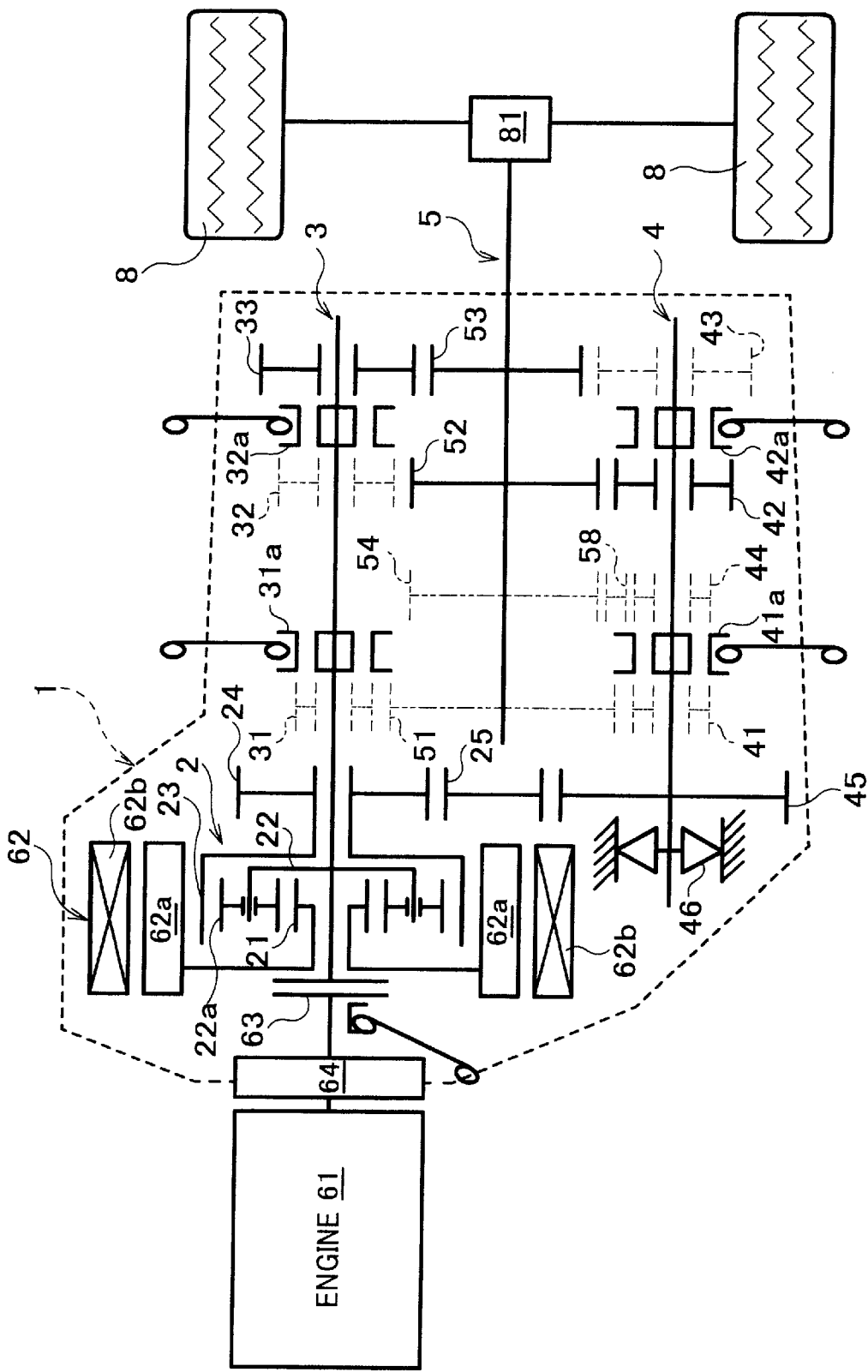
FIG. 7 is a skeleton diagram showing the conditions of gear engagement for the third speed.

Shifting from the second to the third speed will be described. The motor controller 13 controls the motor 62 to decrease its number of revolutions Nm while the engine controller 12 turns down the throttle angle to decrease its number of revolutions Ne, so that the rotations of the carrier shaft 3 and the CT gear 33 may be synchronized. When the engine number of revolutions Ne—the number of revolutions of the carrier shaft 3—is synchronized with that of the CT gear 33, the clutch 63 is disengaged while the CSDOG 32a is engaged with the CT gear 33 (three speed side). FIG. 7 shows the conditions of gear engagement for this case. Under these conditions it is possible to perform an efficient driving free of the friction of the engine 61 by disengaging the clutch 63, since all three inputs and outputs of the planetary gear unit 2 exist by the connection of the ring shaft 4 and the RS gear 42 and that of the carrier shaft 3 and the CT gear 33. The engine 61, to which the power transmission is disconnected, is stopped in order to save the energy (t10).

The third speed driving is basically exerted by the power generated by the motor 62 only. When acceleration is desired or the vehicle approaches a slope, it is possible to supply the driving wheels 8 with the required driving torque by increasing the motor torque appropriately. In case the sufficient torque is not attained, the engine 61 is started connecting the clutch 63 gradually, to supplement the torque of the motor 62 (t11–t13). When the residual energy of the battery 13b is running short, the battery 13b is charged by the motor 62 set for a regenerative mode, following the steps of starting the engine 61, connecting the clutch 63 and keeping the maximum engine driving efficiency.

[Third Speed→Second Speed]

Shifting from the third to the second speed and the subsequent acceleration will be described. When the engine 61 is at rest in the third speed driving (t15), the engine 61 is started connecting the clutch 63 gradually and increasing the engine number of revolutions Ne. When the clutch 63 is completely engaged (t16), the connection of the carrier shaft 3 and the CT gear 33 is released by switching the CSDOG 32a to neutral, thereby only the power transmission from the ring shaft 4 through the RS gear 42 will exist. Shifting from the third to the second speed will be completed when the motor number of revolutions Nm is set to be a predetermined number by controlling the motor torque (t17). A smooth shifting operation and a smooth acceleration feeling can be obtained at this shifting, since the disconnection of the power transmission by switching the CSDOG 32a to neutral and increasing the motor number of revolutions Nm gradually, which are all operations required for the shifting, are free of the shifting shock and the torque discontinuity at the acceleration.

When the power is transmitted to the counter shaft 5 through the ring shaft 4, shifting to a lower speed can be made in the following steps, which is not limited to shifting from the third to the second speed: synchronizing to connect the carrier shaft 3 and the transmission gear such as the CL gear 31 at a speed level lower than the current one and disconnecting the power transmission path of the ring shaft 4 side by disengaging the RSDOG 42. The same steps may be applied to the acceleration by a kick-down (see t18–t19, the dotted line of the motor torque).

When a quick acceleration is required at the second speed, the engine controller 12 opens the throttle angle to increase the power output of the engine 61 (t18). In case the increase in the power output of the engine 61 cannot effect the desired acceleration, it is possible to increase the torque of the motor 62 for the further acceleration.

[Second Speed→First Speed, Deceleration Regenerative Charging]

When the power is transmitted through the RS gear 42 of the ring shaft 4 side as shown in FIG. 6, it is disconnected in the following manner. Synchronizing the carrier shaft 3 with the CL gear 31 by increasing the motor number of revolutions Nm and positioning the RSDOG 42a in neutral while engaging the CLDOG 31a with the CL gear 31 (L side), thereby the power transmission from the ring shaft 4 will be disconnected. FIG. 8 shows the conditions of gear engagement for this case. In FIG. 8, the power output of the engine 61 is transmitted to the carrier shaft 3 to drive the counter shaft 5 through the CL gear 31. The number of revolutions of the ring shaft 4 can be varied arbitrarily through the ring gear 23 by controlling the number of revolutions of the motor 62.

Setting the motor in regenerative mode by decreasing the motor number of revolutions Nm and increasing the number of revolutions of the ring shaft 4, thereby the rotation of the ring shaft 4 and that of the RL gear 41 are synchronized. Subsequently, positioning the CLDOG 31a in neutral and disconnecting the carrier shaft 3 from the CL gear 31 while engaging the RLRDOG 41a with the RL gear 41 (L side), thereby the power is transmitted from the ring shaft 4 in the first speed (see FIG. 4).

If a brake pedal is depressed, the vehicle will be decelerated by controlling the load of the motor 62.

[Stop, Idling]

It is possible to set the vehicle at rest with the engine 61 idling by controlling the number of revolutions of the motor 62 so that the engine 61 rotates at the idling number of revolutions. When idling of the engine 61 is not necessary, the ignition of the engine 61 should be switched off and the rotation of the motor 62 should also be stopped.

The power transmission apparatus according to the present embodiment is a transmission mechanism. When either of the carrier shaft 3 as the first main shaft or the ring shaft 4 as the second main shaft is connected to the counter shaft 5 at the first speed, the power transmission apparatus 1 allows another shaft to be connected to the counter shaft 5 at the second speed, by controlling the number of revolutions of the motor 62. The subsequent disconnection of the first speed enables a shifting without shock and driving power discontinuity. A smooth shifting and a smooth acceleration feeling can thus be attained. A highly efficient power transmission can be achieved, obviating the transmission loss caused by the slip inherent in a belt driving, since the gears are employed for the power transmission. Since the synchronization of the gear to be shifted is performed by controlling the number of revolutions of the motor 62 as mentioned before, no synchronization mechanisms are required so that the structure of the mechanism may be simplified.

What is claimed is:

1. A power transmission apparatus for a hybrid vehicle including two driving means, an engine and a motor generator which has a rotor to rotate supplied with electricity and serves as a power generator supplied with torque, comprising;

a planetary gear unit including at least a sun gear, a carrier and a ring gear; and a counter shaft for transmitting power to driving wheels of the vehicle, wherein said rotor of the motor generator is connected to said sun gear, an engine output shaft and a first main shaft which is capable of transmitting torque to said counter shaft through first gears in a first plurality of transmission gear ratios are connected to said carrier, and torque of said ring gear can be transmitted through second gears to a second main shaft which is capable of transmitting torque to said counter shaft through third gears in a second plurality of transmission gear ratios.

2. A power transmission apparatus for a hybrid vehicle according to claim 1, wherein said engine output shaft and said carrier are connected through a clutch, which is capable of connecting and disconnecting power selectively.

3. A method for controlling the power transmission apparatus for a hybrid vehicle according to claim 1, the method comprising the steps of;

when a shifting is performed from a first shifting level to a second shifting level, synchronizing one of said first and second main shafts with said counter shaft in said second shifting level by controlling a number of revolutions of said motor generator, while the other of said shafts engages with said counter shaft in the said first shifting level; and performing a transition from said first shifting level to said second shifting level by connecting one of said shafts with said counter shaft while disconnecting the other of said shafts from said counter shaft.

4. A method for controlling the power transmission apparatus for a hybrid vehicle according to claim 2, the method comprising the steps of;

when a shifting is performed from a first shifting level to a second shifting level, synchronizing one of said first and second main shafts with said counter shaft in said second shifting level by controlling a number of revolutions of said motor generator, while the other of said shafts engages with said counter shaft in the said first shifting level; and performing a transition from said first shifting level to said second shifting level by connecting one of said shafts with said counter shaft while disconnecting the other of said shafts from said counter shaft.

* * * * *